(12) United States Patent
Koermer

(10) Patent No.: US 8,178,064 B2
(45) Date of Patent: May 15, 2012

(54) TREATMENT OF POWER UTILITIES EXHAUST

(75) Inventor: Gerald Koermer, Basking Ridge, NJ (US)

(73) Assignee: BASF Corporation, Florham Park ( * ) Notice: Subject to any disclaimer, the term of this patent is extended or adjusted under 35 U.S.C. 154(b) by 42 days.

(21) Appl. No.: 12/776,887

(22) Filed: May 10, 2010

(65) Prior Publication Data

US 2010/0284875 A1 Nov. 11, 2010

Related U.S. Application Data

(60) Provisional application No. 61/177,208, filed on May 11, 2009.

(51) Int. Cl.
*B01D 53/56* (2006.01)

(52) U.S. Cl. ..................... 423/239.1; 423/237

(58) Field of Classification Search ............... 423/239.1, 423/237
See application file for complete search history.

(56) References Cited

U.S. PATENT DOCUMENTS

| | | | |
|---|---|---|---|
| 3,900,554 A | 8/1975 | Lyon | |
| 4,208,386 A | 6/1980 | Arand et al. | |
| 4,325,924 A | 4/1982 | Arand et al. | |
| 5,104,629 A | 4/1992 | Dreschler | |
| 5,824,621 A | 10/1998 | Abe et al. | |
| 5,880,196 A | 3/1999 | Cho et al. | |
| 6,045,765 A | 4/2000 | Nakatsuji et al. | |
| 6,057,259 A | 5/2000 | Miyadera et al. | |
| 6,176,079 B1 | 1/2001 | Konrad et al. | |
| 6,284,211 B1 | 9/2001 | Miyadera et al. | |
| 7,240,484 B2 | 7/2007 | Li et al. | |
| 7,257,945 B2 | 8/2007 | Kass et al. | |
| 7,332,135 B2 * | 2/2008 | Gandhi et al. | 422/177 |
| 7,393,511 B2 | 7/2008 | Tran et al. | |
| 7,402,292 B2 * | 7/2008 | Hemingway et al. | 423/239.1 |
| 7,550,125 B2 * | 6/2009 | Duvinage et al. | 423/213.2 |
| 2003/0180196 A1 | 9/2003 | Gillespie et al. | |
| 2004/0136890 A1 * | 7/2004 | Lang et al. | 423/239.1 |
| 2005/0002843 A1 | 1/2005 | Kim et al. | |
| 2007/0031310 A1 | 2/2007 | Lee | |
| 2008/0069741 A1 | 3/2008 | Koermer et al. | |
| 2008/0069743 A1 | 3/2008 | Castellana et al. | |
| 2008/0070778 A1 | 3/2008 | Castellana et al. | |
| 2008/0187478 A1 * | 8/2008 | Robel et al. | 423/239.1 |
| 2009/0087367 A1 | 4/2009 | Liu et al. | |
| 2010/0192545 A1 | 8/2010 | Schmieg et al. | |

FOREIGN PATENT DOCUMENTS

EP 0 667 182 8/1995

(Continued)

OTHER PUBLICATIONS

Aoyama et al., "Characterization of an AgCl/Al2O3 catalyst for lean NO conversion", Phys. Chem. Chem. Phys., 1: 3365-3367 (1999).

(Continued)

*Primary Examiner* — Timothy Vanoy
(74) *Attorney, Agent, or Firm* — Melanie L. Brown

(57) ABSTRACT

Provided is a process for treating nitrogen oxide-containing exhaust produced by a stationary combustion source by the catalytic reduction of nitrogen oxide in the presence of a reductant comprising hydrogen, followed by ammonia selective catalytic reduction to further reduce the nitrogen oxide level in the exhaust.

20 Claims, 1 Drawing Sheet

FOREIGN PATENT DOCUMENTS

| EP | 0 773 354 A1 * | 5/1997 |
|---|---|---|
| WO | WO 97/22476 | 6/1997 |
| WO | WO 2007/018990 | 2/2007 |

OTHER PUBLICATIONS

DiMaggio et al., "Dual SCR Aftertreatment for Lean NOx Reduction," SAE paper, document 2009-01-0277, Apr. 2009.

He et al., "Selective Catalytic Reduction of NOx with Organic Compounds Over $Ag/Al_2O_3$ Catalyst," pp. 161-182 in: New Developments in Catalysis Research, Bevy (ed), Nova Science Publishers, Inc., Hauppague, NY (2005).

Kass et al., "Selective Catalytic Reduction of Diesel Engine Nox Emissions Using Ethanol as a Reductant", Proceedings: 2003 DEER Conference.

Miyadera et al., "Selective Reduction of NOx Over Alumina-supported Silver Catalyst", Trans. Mat. Res. Soc. Jpn., 18A: 405-408 (1994).

Shimizu et al., "Selective catalytic reduction of NO over supported silver catalysts—practical and mechanistic aspects", Phys. Chem. Chem. Phys., 8: 2677-2695 (2006).

Takagi et al., "Selective reduction of NO on Ag/Al2O3 catalysts prepared from boehmite needles", Catalysis Today 45: 123-127 (1998).

Thomas et al., "Hydrocarbon Selective Catalytic Reduction Using a Silver-Alumina Catalyst with Light Alcohols and Other Reductants", SAE Technical Papers, document No. 2005-01-1082 (2005), Abstract only.

* cited by examiner

TREATMENT OF POWER UTILITIES EXHAUST

CROSS-REFERENCE TO RELATED APPLICATIONS

This application claims the benefit pursuant to 35 U.S.C. §119(e) of U.S. Provisional Application No. 61/177,208, filed on May 11, 2009, which is hereby incorporated by reference in its entirety herein.

GOVERNMENT CONTRACT RIGHTS

The U.S. Government has a paid-up license in this invention and the right in limited circumstances to require the patent owner to license others on reasonable terms as provided for by the terms of DE-FC26-02NT41218 awarded by the U.S. Department of Energy.

BACKGROUND

Much of the electrical power used in homes and businesses throughout the world is produced in power plants that burn a fossil fuel (i.e. coal, oil, or gas) in a boiler. The resulting hot exhaust gas (also sometimes termed "flue gas") turns a gas turbine or boils water to produce steam, which turns a steam turbine, and the turbine cooperates with a generator to produce electrical power. The flue gas stream is subsequently passed through an air preheater, such as a rotating wheel heat exchanger that transfers heat from the flue gas to an incoming air stream, which thereafter flows to the combustor. The partially cooled flue gas is directed from the air preheater to the exhaust stack.

The flue gas contains contaminants such as sulfur oxides (SOx), nitrogen oxide (NOx), carbon monoxide (CO) and particulates of soot when coal is used as the primary fuel source. The discharge of all of these contaminates into the atmosphere is subject to federal and local regulations, which greatly restrict the levels of these flue gas components.

To meet the reduced levels of NOx emissions from power stations, as required by environmental regulations, many fossil fuel-fired electric generating units are being equipped with either selective catalytic reduction (SCR) or selective non-catalytic reduction (SNCR) technologies. In SCR, the most common method used is to inject ammonia or urea based reagents in the presence of a vanadium oxide catalyst where the ammonia reacts to reduce the oxides of nitrogen. SCR is generally accomplished at lower temperatures than SNCR. The SCR system typically operates at flue gas temperatures ranging between 300° C. and 450° C. U.S. Pat. No. 5,104,629 illustrates one known type of SCR installation.

In SNCR, the most common method used is to inject ammonia or urea based reagents into the upper furnace to reduce the oxides of nitrogen without the use of a catalyst. The SNCR system operates at flue gas temperatures ranging between 850° C. and 1150° C. U.S. Pat. Nos. 3,900,554, 4,208,386, and 4,325,924 illustrate known types of SNCR applications.

At coal-fired power plants, ammonia injection systems for SCR and SNCR systems are typically installed in the high-temperature and high-dust region of the flue gas stream, which typically is prior to ash collection. One disadvantage of current treatments for reducing nitrogen oxides in exhaust gases from stationary combustion sources is the large ammonia consumption.

There is a need in the art for alternative methods of reducing nitrogen oxides in exhaust from power plants and other stationary sources. The methods disclosed address that need.

SUMMARY

A method for treating exhaust from stationary combustion source, such as a coal-fired power plant, comprising nitrogen oxide (NOx) using a selective reduction catalyst, such as a silver-based catalytic material, and a reductant comprising hydrogen, such as hydrogen gas or a hydrocarbon, to produce ammonia and an catalyst for selective reduction of NOx by ammonia. In some embodiments, the selective reduction catalyst comprises silver particles dispersed on a refractory support material. In some embodiments, the refractory support material used to prepare the silver-based catalytic material is a hydroxylated alumina, such as pseudoboehmite or boehmite. In some embodiments, the reductant comprising hydrogen is hydrogen gas. In other embodiments, the reductant is a hydrocarbon. The hydrocarbon may one or more oxygenated hydrocarbons, one or more non-oxygenated hydrocarbon or a mixture thereof. In some embodiments, the hydrocarbon comprises a combination of ethanol and gasoline or ethanol and diesel. In some embodiments, the hydrocarbon consists essentially of ethanol.

BRIEF DESCRIPTION OF THE DRAWINGS

There are depicted in the drawings certain embodiments. However, the methods are not limited to the precise arrangements and instrumentalities of the embodiments depicted in the drawings.

DETAILED DESCRIPTION

Figures 1A, 1B:
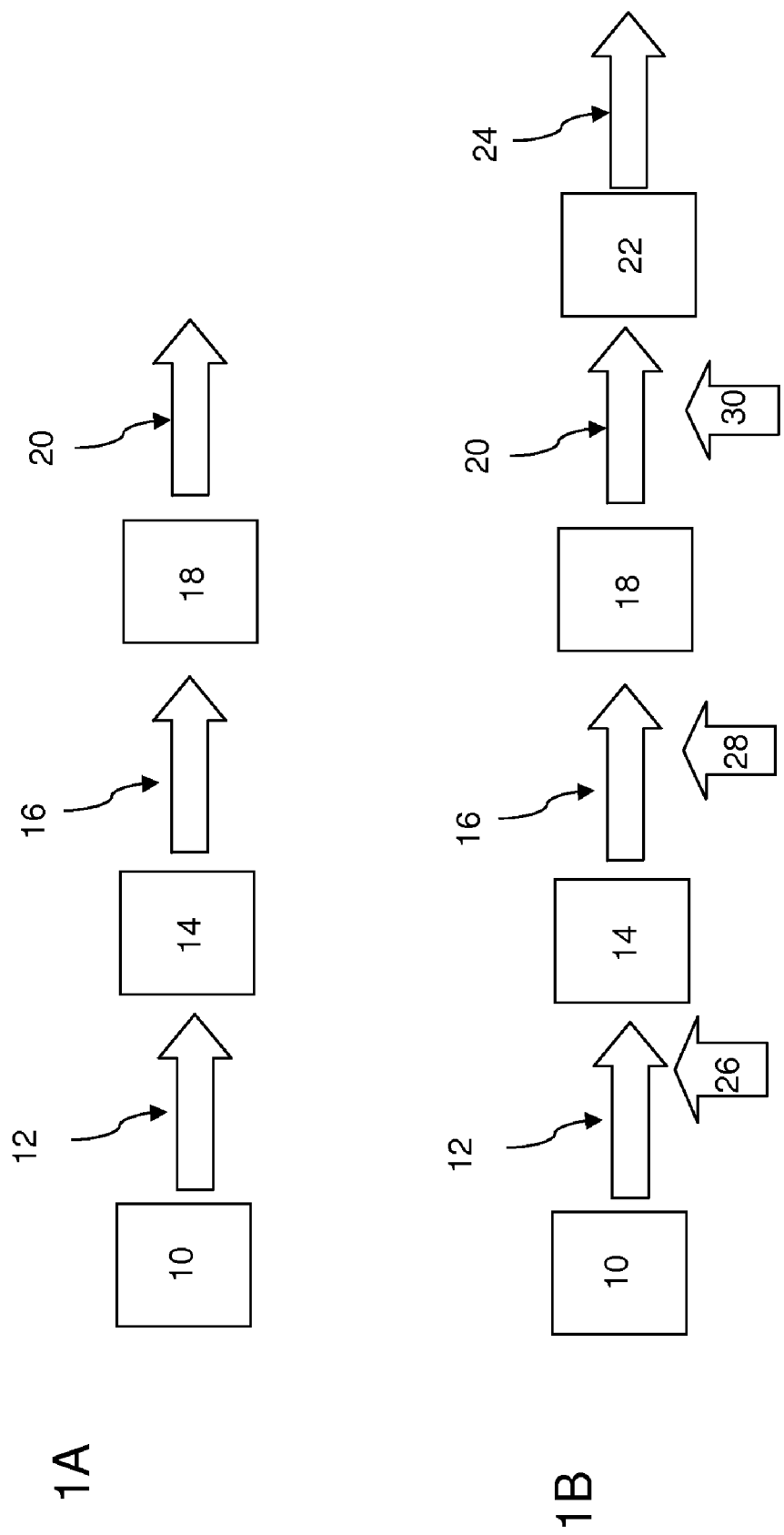
FIGS. 1A and 1B are schematic drawings of various embodiments of the method described herein.

In an embodiment, a catalyst of silver supported on alumina, prepared from a hydroxylated alumina, such as pseudo-boehmite, unexpectedly has a high selectivity for production of ammonia by the reduction of nitrogen oxides in the presence of a reductant comprising hydrogen, such as a hydrocarbon, and particularly an oxygenated hydrocarbon. Such a catalyst can be used downstream of a process that generates the undesirable production of nitrogen oxide to reduce the level of nitrogen oxide by producing ammonia. The ammonia produced is subsequently available as a reductant for selective catalytic reduction of nitrogen oxide so as to additionally reduce the level of nitrogen oxide in the exhaust stream. Accordingly, a method of treating a gas stream comprising nitrogen oxide generated by a stationary combustion source is provided.

Definitions

Unless defined otherwise, all technical and scientific terms used herein generally have the same meaning as commonly understood by one of ordinary skill in the art. Generally, the nomenclature used herein is well known and commonly employed in the art.

It is understood that any and all whole or partial integers between any ranges set forth herein are included herein.

As used herein, each of the following terms has the meaning associated with it in this section.

The articles "a" and "an" are used herein to refer to one or to more than one (i.e., to at least one) of the grammatical object of the article.

The term "about" will be understood by persons of ordinary skill in the art and will vary to some extent on the context in which it is used. Generally, about encompasses a range of values that are plus/minus 10% of a reference value. For instance, "about 25%" encompasses values from 22.5% to 27.5%.

As used herein with reference to the selectivity of a catalyst, the term "selectivity" means the mole percent (%) of the desired product formed (e.g., ammonia) relative to the total of nitrogen oxide converted. A catalyst can have high conversion and low selectivity. For instance, a catalyst can have greater than 80% of the input converted to products, while less than 5% of the product is the desired product. A catalyst can also have low conversion and high selectivity. For instance, less than 50% of the input is converted, while substantially all of the input converted is the desired product (~100% selectivity). Ideally, a catalyst has both high conversion and high selectivity. Yield of a given product equals conversion times selectivity for that product. Thus, when conversion is 100%, yield equals selectivity.

As used herein, "nitrogen oxide" and "NOx" refers to one or more of NO, $NO_2$ and $N_2O$.

As used herein, the term "hydroxylated" means that the surface of the alumina has a high concentration of surface hydroxyl groups in the alumina as it is obtained. Examples include boehmite, pseudoboehmite or gelatinous boehmite, diaspore, nordstrandite, bayerite, gibbsite, alumina having hydroxyl groups added to the surface, and mixtures thereof.

As used herein, "inlet" refers to the site where the feed stream enters the catalyst, while "outlet" refers to the site where the reacted feed stream exits the catalyst.

As used herein, "upstream" refers to the inlet side or direction of the catalyst. "Downstream" refers to the outlet side or direction of the catalyst.

As used herein, "stationary combustion source" refers to any engine that combust hydrocarbon fuel. Exemplary stationary combustion sources include coal- or petroleum-fired power plants and gas turbine engines. In one embodiment, the term excludes internal combustion engines.

As used herein, a "reductant comprising hydrogen" refers to a hydrogen-containing molecule or compound that can function as a reducing agent for nitrogen oxide in the presence of a catalyst under the conditions typically found in stationary combustion source exhaust.

As used herein, a component "provided endogenously" in an exhaust stream refers to a component that is present in the exhaust stream as a result of combustion or catalysis. For instance, a hydrocarbon provided endogenously is a hydrocarbon that is derived by incomplete combustion of the hydrocarbon fuel that is combusted in a stationary combustion source. Ammonia provided endogenously is ammonia produced by the selective reductant catalyst reducing nitrogen oxide in the present of a reductant comprising hydrogen.

As used herein, a component "provided exogenously" in an exhaust stream refers to a component that is introduced into a exhaust stream. For instance, a hydrocarbon injected into the exhaust stream downstream of the stationary combustion source and upstream of the selective reductant catalyst is exogenously provided.

As used herein, "silver particles" refers to silver in the form of silver atoms, aggregates of silver atoms, and aggregates of silver atoms plus one or more oxygen atoms, where aggregates refer to a cluster of atoms in an indeterminate structure. The silver atoms can be ionized, and aggregates of the silver particles can have a net positive charge; silver atoms and aggregates within silver particles can also not have a net charge.

Description

In accordance with some embodiments, provided is a process for treating an exhaust stream from a stationary combustion source by contacting a selective reduction catalyst, such as a silver-alumina catalyst, under suitable nitrogen oxide reduction process conditions, with a gaseous feed stream that comprises nitrogen oxide and a reductant comprising hydrogen to reduce a portion of the nitrogen oxide to ammonia, then contacting the resultant gas stream comprising ammonia and nitrogen oxide with an ammonia selective catalyst to reduce an additional portion of nitrogen oxide to nitrogen and water. Advantageously, the process enables the reduction or elimination of exogenous ammonia for reduction on the ammonia selective catalyst.

An exemplary composition of a exhaust stream useful in practicing the method is that obtained from the combustion of diesel or gasoline in a stationary combustion source. Accordingly, the feed stream treated in the method may comprise oxygen, water, carbon monoxide, carbon dioxide, hydrocarbons and hydrogen in amounts substantially similar to that present in a diesel or gasoline exhaust stream, in addition to nitrogen oxide and a reductant. These other components (oxygen, water, carbon monoxide, carbon dioxide, hydrocarbons and hydrogen), however, are optional. Where the feed stream comprises oxygen, the nitrogen oxide need not include $NO_2$, in the practice of the inventive method.

An embodiment of the method is schematically illustrated in FIG. 1A. A stationary exhaust source 10 generates a first exhaust stream 12 comprising nitrogen oxide. The first exhaust stream 12 contacts a selective reduction catalyst 14 in the presence of a reductant comprising hydrogen, producing a second exhaust stream 16 comprising nitrogen oxide and ammonia. The second exhaust stream 16 contacts an ammonia selective catalyst 18 which catalyzes the reduction of nitrogen oxide with ammonia to nitrogen and water. This step produces a third exhaust stream 20 comprising nitrogen, water and a much-reduced amount nitrogen oxide, which may be emitted to the environment or may be subjected to additional treatment.

Another embodiment of the method is schematically illustrated in FIG. 1B. In this embodiment, the third exhaust stream 20 contacts an ammonia oxidation catalyst 22 to oxidize residual ammonia in the third exhaust stream. This step produces a fourth exhaust stream 24, which may be emitted to the environment or may be subject to additional treatment. In this embodiment, other optional elements are indicated, including an optional exogenous reductant source 26, an optional exogenous ammonia source 28 and an optional oxygen source 30. In some embodiments, the exogenous hydrocarbon source 26, and/or the optional exogenous ammonia source 28 are incorporated into the method as embodied in FIG. 1A. The ammonia selective catalyst 18 and the ammonia oxidation catalyst 22 may be on separate substrates (as depicted in FIG. 1B) or may be on the same substrate. For instance, the ammonia oxidation catalyst can be zone coated downstream of the ammonia selective catalyst and on the same substrate as the ammonia selective catalyst.

I. Selective Reduction Catalyst

The method comprises contacting an exhaust stream from a stationary combustion source comprising nitrogen oxide with a selective reduction catalyst in the presence of a reductant comprising hydrogen. The selective reduction catalyst in the method can be any catalyst known in the art to reduce nitrogen oxide in the presence of a reductant comprising hydrogen. Exemplary catalysts include a metal selected from a Group IB element (e.g., copper, silver, gold); a Group VIB element (e.g., vanadium, niobium, tantalum); a Group VIB element (e.g., chromium, molybdenum, tungsten); a VIIB element (e.g., manganese, rhenium); and a VIIIB element (e.g., iron, cobalt, nickel, ruthenium, rhodium, palladium, platinum, osmium and iridium). The catalyst is supported on any refractory material known in the art, such as alumina or silica-alumina, and the supported catalyst is deposited on a substrate. In some embodiments, the catalytic component of the selective reductive catalyst excludes other precious metals, such as platinum, palladium, rhodium, iridium and gold, and/or non-precious metals, such as base metals. In some embodiments, the catalytic component consists essentially of silver.

In some embodiments, the selective reduction catalyst is a silver-alumina catalyst that comprises silver particles dispersed on alumina as the catalytic component. In a one embodiment, the alumina used to prepare the catalytic material is pseudoboehmite. In some embodiments, the hydrocarbon is an oxygenated hydrocarbon, such as ethanol.

Two thermodynamically-favored reactions believed to be relevant to the method of producing ammonia from a feed stream comprising nitrogen oxide and a hydrocarbon, such as an oxygenated hydrocarbon, e.g., ethanol, are:

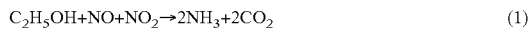

$$C_2H_5OH+NO+NO_2 \rightarrow 2NH_3+2CO_2 \quad (1)$$

$$C_2H_5OH+2NO+0.5O_2 \rightarrow 2NH_3+2CO_2 \quad (2)$$

Reaction 1 produces ammonia from $NO_x$. Reaction 2 is similar to reaction 1, except that $NO_2$ has been replaced by an equivalent amount of NO and oxygen.

In practicing the method, an exhaust stream comprising nitrogen oxide with a catalyst in the presence of a reductant comprising hydrogen. In some embodiments, the reductant is selected from the group consisting of hydrogen, an oxygenated hydrocarbon, a non-oxygenated hydrocarbon and mixtures thereof. The reductant may be substantially hydrogen, or a single hydrocarbon or may be a mixture of two or more hydrocarbons. Hydrocarbons useful in the method comprise non-oxygenated and oxygenated hydrocarbons, and mixtures thereof. Mixtures may be mixtures of two or more oxygenated hydrocarbons, mixtures of two or more non-oxygenated hydrocarbons, and mixtures of one or more oxygenated hydrocarbons and one or more non-oxygenated hydrocarbons. Exemplary hydrocarbons include saturated, olefinic and aromatic hydrocarbons, including branched and linear hydrocarbons and olefins, as well as substituted aromatics and mixtures thereof. Examples include dodecane, xylene, isooctane, 1-octene, n-octane and mixtures, such as a mixture of dodecane and xylene and fuels such as gasoline and diesel fuel. Oxygenated hydrocarbons useful in the methods are C1 to C8 compounds containing one or more oxygenated functional groups, such as hydroxyl (—OH), aldehyde, ketone, ester, lactone or acid groups. In some embodiments, an oxygenated hydrocarbon is selected from the group consisting of C1 to C4 alcohols and C2 diols. Examples include, but not limited to, methanol, ethanol, propanol, isopropanol, butanol, 1,3-propanediol, 1,4-propanediol, ethylene glycol, acetaldehyde, propanal, acetic acid, 1-hydroxy propanal, acetone, and mixtures thereof. In yet another embodiment, the oxygenated hydrocarbon is ethanol. Mixtures including oxygenated hydrocarbons are also useful, such as a mixture of ethanol, isooctane, 1-octene, n-octane and m-xylene or a mixture of ethanol and a fuel, such as gasoline or diesel. In particular, a mixture of oxygenated hydrocarbon and non-oxygenated hydrocarbon comprising at least about 50 vol. % oxygenated hydrocarbon is useful. In one embodiment, a mixture is used comprising at least about 50 vol. % ethanol mixed with gasoline. The reductant may be present in the exhaust stream endogenously, such as a feed stream produced by combustion of diesel or gasoline containing fuel additives, or may be introduced into the feed stream exogenously prior to or substantially concurrent with the exhaust stream contacting the selective reduction catalyst. For exogenous addition, sensors at various positions in the exhaust stream are used to monitor reaction conditions and additional, exogenous reductant can be metered in as necessary. In practicing the method, the ratio of oxygenated hydrocarbon to nitrogen oxide ($HC_1:NO_x$) is at least about 2.2. In some embodiments, the $HC_1:NO_x$ ranges between about 2.2 and 4.3. In other embodiments, the $HC_1:NO_x$ ranges between about 2.2 and 8.6. In yet other embodiments, the $HC_1:NO_x$ ranges between about 4.3 and 8.6.

In some embodiments, the selective reductive catalyst used in the method comprises as the catalytic component silver dispersed on alumina particles; preferably the silver has a diameter of less than about 20 nm. The silver catalyst enables a high conversion of input nitrogen oxides. In exemplary embodiments, the catalyst converts between about 30% to about 65% of the nitrogen oxide, which provides sufficient ammonia to convert a substantial portion of the remaining nitrogen oxide to nitrogen and water. Furthermore, the catalyst is shown herein to have a high selectivity for producing ammonia from nitrogen oxides. Consequently, the silver catalyst has a high yield of ammonia. Silver supported on alumina, wherein the silver is deposited on a hydroxylated alumina to prepare the catalyst, catalyzes at least about 25%, preferably at least about 30%, more preferably at least about 37% and more preferably still at least about 40% of input nitrogen oxide to ammonia in the method. Such high yield has not been disclosed for alumina-supported silver catalysts in the prior art. Advantageously, a high conversion rate of input nitrogen oxide can be achieved and the production of undesirable by-products, such as acetaldehyde and cyanide, by the alumina-supported silver catalyst can be minimized (thereby increasing selectivity for ammonia), by judicious selection of reaction conditions, for instance, temperature and choice of reductant. Yields in excess of at least about 50%, 60%, 70%, 80%, 90%, or 95% are therefore also contemplated. Preferably, the catalyst temperature is from about 200 degrees centigrade (° C.) to about 550° C., more preferably from about 300° C. to about 500° C. and most preferably from about 350° C. to about 450° C.

In some embodiments, the method is practiced at about 300° C. with a catalyst consisting essentially of 3 wt % silver (on a $Ag_2O$ basis) supported on alumina, the catalyst being prepared using pseudoboehmite, is employed, where at least about 90% and preferably about 100% of input nitrogen oxide is converted and the selectivity is at least about 25%. In other embodiments, the method is practiced from about 350° C. to about 450° C., with a catalyst consisting essentially of 3 wt % silver (on a $Ag_2O$ basis) supported on alumina, the catalyst being prepared using pseudoboehmite, is employed, where about 100% of input nitrogen oxide is converted, the selectivity is at least about 37%, essentially no acetaldehyde or cyanide is produced. In these preferred embodiments, the hydrocarbon comprises an oxygenated hydrocarbon and preferably comprises at least about 85% is ethanol and the $HC_1:NO_x$ is about 8.6.

In the practice of the method, the space velocity of the reaction may be selected to adjust the production of ammonia under the given reaction conditions. In the present application, an ammonia production of about 50% yield of ammonia is suitable to provide sufficient ammonia to react further with NOx on the ammonia selective catalyst. Armed with the present disclosure and the knowledge in the art, the skilled artisan can determine the optimal ammonia yield for practicing the present invention. It is contemplated that the method is practiced using sensors positioned at various points in the exhaust stream to monitor continuously or periodically the NOx and ammonia components in order to optimize the conditions as needed.

For high yields of ammonia, it is desirable to minimize the contact time of the feed gas stream with the catalyst. The contact time can be reduced by increasing the space velocity and thus reducing competing reactions.

An exemplary silver-alumina catalyst comprises about 1 to 5 weight percent (wt %) silver, preferably 2 to 4 wt % and most preferably about 3 wt %, on an $Ag_2O$ basis, supported on alumina. Note that the silver in the catalyst is not necessarily in the form of $Ag_2O$; the weight percent is indicated on an $Ag_2O$ basis because it is common practice in elemental analysis data of elements in an oxide matrix to be reported as metal oxides. The weight percent on an $Ag_2O$ basis is readily converted to weight percent silver by multiplying by the ratio of the atomic weight of silver and the molecular weight of $Ag_2O$. For instance, 3 wt % silver on an $Ag_2O$ basis is equal to about 2.72 wt % silver. The catalyst is prepared by depositing silver on a refractory support material, preferably alumina. In a preferred embodiment, the catalyst used in the method is prepared by depositing silver on highly hydroxylated alumina. Exemplary hydroxylated alumina compounds include boehmite, pseudoboehmite or gelatinous boehmite, diaspore, nordstrandite, bayerite, gibbsite, alumina having hydroxyl groups added to the surface, and mixtures thereof. Pseudoboehmite and gelatinous boehmite are generally classified as non-crystalline or gelatinous materials, whereas diaspore, nordstrandite, bayerite, gibbsite, and boehmite are generally classified as crystalline. According to one or more embodiments, the hydroxylated alumina used for preparing a catalyst for producing ammonia is represented by the formula $Al(OH)_x O_y$, where $x=3-2y$ and $y=0$ to 1 or fractions thereof. In the preparation of such hydroxylated aluminas, the alumina is not subject to high temperature calcination, which would drive off many or most of the surface hydroxyl groups.

Substantially non-crystalline hydroxylated aluminas in the form of flat, plate-shaped particles, as opposed to needle-shaped particles, are useful in preparing catalysts. In embodiments, the hydroxylated alumina excludes needle-shaped particles, such as needle-shaped boehmite particles. The shape of the hydroxylated alumina useful for preparing the catalyst used in the inventive method is in the form of a flat plate and has an average aspect ratio of 3 to 100 and a slenderness ratio of a flat plate surface of 0.3 to 1.0. The aspect ratio is expressed by a ratio of "diameter" to "thickness" of a particle. The term "diameter" as used herein means a diameter of a circle having an area equal to a projected area of the particle, which is obtained by observing the alumina hydrate through a microscope or a Transmission Electron Microscope (TEM). The slenderness ratio means a ratio of a minimum diameter to a maximum diameter of the flat plate surface when observed in the same manner as in the aspect ratio.

Hydroxylated, flat, plate-shaped particulate aluminas which may be used in producing the catalysts according to embodiments are known and are commercially available. Processes for producing them are also known. Exemplary processes for producing pseudoboehmite are described in, for example, U.S. Pat. No. 5,880,196 and International Publication No. WO 97/22476.

Pseudoboehmite has a boehmite-like structure. The X-ray diffraction pattern, however, consists of very diffuse bands or halos. The spacings of the broad reflections correspond approximately with the spacings of the principal lines of the pattern of crystalline boehmite, but the first reflection, in particular, commonly shows appreciable displacements to values as large as about 0.66 to 0.67 nanometer compared with the 0.611 nanometer reflection for the 020 line for boehmite. It has been suggested that although the structure resembles that of boehmite in certain respects, the order is only of very short range. It is generally accepted by those skilled in the art that pseudoboehmite is a distinct phase which is different from boehmite. See ENCYCLOPEDIA OF CHEMICAL TECHNOLOGY, 5$^{th}$ Ed., Vol. 2, Wiley Inter science, 2004, pages 421-433, and "Oxides and Hydroxides of Aluminum," Alcoa Technical Paper No. 19, Revised, by Karl Wefers and Chanakya Misra, 1987, Copyright Aluminum Company of America.

Alternatively, a calcined alumina can be treated in a manner to add surface hydroxyl groups, for example, by exposing the alumina to steam for a period of time. In one or more embodiments, the alumina used for silver impregnation is substantially free of gamma alumina. Upon calcination, the hydroxylated alumina used during the preparation may transform to, for example, gamma alumina. Thus, the final catalyst after silver impregnation, drying, calcination, and/or hydrothermal treatment, may comprise gamma alumina and/or other high temperature alumina phases.

In one or more embodiments, the silver particles supported on alumina is substantially free of silver metal and/or silver aluminate. As used herein, substantially free means that there is less than 0.1% by weight of silver metal or silver aluminate. As used herein, "silver metal" means silver in the zero oxidation state, which means that the silver atom is neither positively nor negatively charged. The zero oxidation state is typically the oxidation state for aggregates of uncharged silver atoms or silver metal contrasted with positively charged silver, which is called "ionized silver" or "ionic silver." An ionic silver atom has a positive charge (+1) and is said to have a +1 oxidation state. Since elemental silver has a single electron in its outermost electron shell, Ag (I) or $Ag^{+1}$ is by far the most common oxidation state for ionic silver. If the silver atom accepts an electron from a more electropositive material it would then become negatively charged and said to have a "−1" oxidation state, or alternatively be a negative ion or anion.

Silver catalysts useful in practicing the method have silver particles well-dispersed on the surface of the alumina. A small particle size indicates high dispersion on the surface of the alumina. According to one or more embodiments, the supported silver particles have an average particle size of less than about 20 nm, more preferably less than about 10 nm and more preferably less than about 2 nm. Transmission Electron Microscope (TEM) analysis of catalysts can be used to assess the size of silver particles.

As noted above, suitable aluminas for preparation of the catalytic material include boehmite or pseudo boehmite/gelatinous alumina with surface area of at least about 20 $m^2/g$. According to one or more embodiments, the hydroxylated alumina used for preparation of the catalytic material is substantially free of gamma alumina. The silver may be deposited on the alumina support by any method known in the art, including wet impregnation and incipient wetness impregnation. "Incipient wetness" is known in the art to mean a volume of solution equal to the pore volume of the support. In the wet impregnation process, the support is immersed in an excess amount of silver-containing solution, followed by evaporation of the excess liquid. A single impregnation or a series of impregnations, with or without intermediate drying, may be used, depending in part upon the concentration of the silver salt in the solution. The deposition of silver can also be achieved by other techniques, such as chemical vapor deposition.

The hydroxylated alumina is impregnated with a water soluble, ionic form of silver such as silver acetate, silver nitrate, etc., and followed by drying and calcining the silver-impregnated alumina at a temperature low enough to fix the silver and decompose the anion (if possible). Typically, for the nitrate salt, this calcination temperature would be about 450-550° C. to provide an alumina that has substantially no silver particles greater than about 20 nm in diameter. In certain embodiments, the diameter of the silver particles is less than 10 nm, and in other embodiments, the silver particles are less than about 2 nm in diameter.

In one or more embodiments, the processing is performed so that the silver is present in substantially ionic form, and there is substantially no silver metal present, as determined by UV spectroscopy. In one or more embodiments, there is substantially no silver aluminate present. The absence of silver metal and silver aluminate can be also confirmed by x-ray diffraction analysis. Following the calcination step, the catalyst is optionally subjected to a hydrothermal treatment in 10% steam in air. The hydrothermal treatment can be carried out at temperatures ranging from about 400° C. to 700° C., preferably at about 650° C., for 1 to 48 hours.

It may also be desired to modify the hydroxylated alumina prior to impregnation with silver. This can be accomplished utilizing a variety of chemical reagents and/or processing treatments such as heat or steam treatments to modify the alumina surface properties and/or physical properties. This modification of the alumina properties may improve the performance properties of the catalyst for properties such as activity, stability, silver dispersion, sintering resistance, resistance to sulfur and other poisoning, etc. However, the processing should be performed so that chemical modification of the alumina surface does not substantially negatively impact the silver-alumina interaction.

The selective reductive catalyst is typically dispersed on a substrate. The substrate may be any of those materials typically used for preparing catalysts, and may comprise a ceramic or metal honeycomb structure or pellets. Any suitable substrate may be employed, such as a monolithic substrate of the type having fine, parallel gas flow passages extending therethrough from an inlet or an outlet face of the substrate, such that passages are open to fluid flow therethrough (referred to as honeycomb flow through substrates). The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 600 or more gas inlet openings (i.e., cells) per square inch of cross section. Monoliths are used in chemical processes to reduce reaction backpressure and increase flow rate (space velocity). Alternatively, the subject catalyst could be in the form of spheres, extrudates, trilobes and other forms common in the chemical and catalyst industries and used, for instance, in a packed bed or fluid bed configuration.

The substrate can also be a wall-flow filter substrate, where the channels are alternately blocked, allowing a gaseous stream entering the channels from one direction (inlet direction), to flow through the channel walls and exit from the channels from the other direction (outlet direction). If such substrate is utilized, the resulting system will be able to remove particulate matters along with gaseous pollutants. The wall-flow filter substrate can be made from materials commonly known in the art, such as cordierite or silicon carbide.

A ceramic substrate may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, alumina, an aluminosilicate and the like.

The substrates useful for the catalysts may also be metallic in nature and be composed of one or more metals or metal alloys. The metallic substrates may be employed in various shapes such as corrugated sheet or monolithic form. Preferred metallic supports include the heat resistant metals and metal alloys such as titanium and stainless steel as well as other alloys in which iron is a substantial or major component. Such alloys may contain one or more of nickel, chromium, and/or aluminum, and the total amount of these metals may advantageously comprise at least 15 wt % of the alloy, e.g., 10-25 wt % of chromium, 3-8 wt % of aluminum and up to 20 wt % of nickel. The alloys may also contain small or trace amounts of one or more other metals such as manganese, copper, vanadium, titanium and the like. The surface of the metal substrates may be oxidized at high temperatures, e.g., 1000° C. and higher, to improve the resistance to corrosion of the alloys by forming an oxide layer on the surfaces of the substrates. Such high temperature-induced oxidation may enhance the adherence of the refractory metal oxide support and catalytically promoting metal components to the substrate.

In alternative embodiments, one or more catalyst compositions may be deposited on an open cell foam substrate. Such substrates are well known in the art, and are typically formed of refractory ceramic or metallic materials.

According to one or more embodiments, when deposited on the honeycomb monolith substrates, such silver on alumina catalyst compositions are deposited on a substrate at a concentration of at least 1 g/in$^3$ to ensure that the desired ammonia production is achieved and to secure adequate durability of the catalyst over extended use. In one embodiment, there is at least 1.6 g/in$^3$ of catalyst, and in particular, there is at least 1.6 to 5.0 g/in$^3$ of the catalyst disposed on the monolith. Catalyst loading on monoliths, or any other substrate, can readily be adjusted by the skilled artisan without undue experimentation.

Catalyst may be deposited on a substrate using any method known in the art. A typical method is washcoating. A single layer of catalyst may be deposited on a substrate, or two or more layers may be deposited. A representative process for preparing a bi-layer washcoat is described. For a bi-layer washcoat, the bottom layer, finely divided particles of a high surface area refractory metal oxide such as gamma alumina are slurried in an appropriate vehicle, e.g., water. The substrate may then be dipped one or more times in such slurry or the slurry may be coated on the substrate (e.g., honeycomb flow through substrate) such that there will be deposited on the substrate the desired loading of the metal oxide. In some embodiments, components such precious metals or platinum group metals, transition metal oxides, stabilizers, promoters and an NO$_x$ sorbent material may be incorporated in the slurry as a mixture of water soluble or water-dispersible compounds or complexes. In another embodiment, the slurry contains only the alumina-supported silver catalyst material in the vehicle. Thereafter, the coated substrate is typically calcined by heating, e.g., at 400 to 600° C. for 1 to 3 hours.

In one or more embodiments, the slurry is comminuted to result in substantially all of the solids having particle sizes of less than 20 microns, e.g., 1-15 microns, in an average diameter. The comminution may be conducted in a ball mill or other similar equipment, and the solids content of the slurry may be, e.g., 20-60 wt %, preferably 35-45 wt %.

In some embodiments, an optional filter may be used upstream of the catalytic reactors used in the method to reduce or eliminate particulates that might occlude the catalysts. Such filters are optionally catalyzed to aid in the removal of collected particulates, for instance, by combustion.

In some embodiments, ammonia is produced when an nitrogen oxide containing gas is contacted with an oxygenated hydrocarbon, such as 100% ethanol or a mixture of at least about 50% ethanol and gasoline or diesel, in the presence of a silver-alumina catalyst under suitable nitrogen oxide reduction conditions. The catalyst is preferably loaded with 3 wt % on the basis of $Ag_2O$, with a silver particle size of less than 20 nm and preferably about 1-2 nm. The catalyst preferably is substantially free of silver aluminate and/or silver metal. The process may be carried out at from about 250° C. to about 600° C. The process is preferably carried out at a temperature in the range of from about 300° C. to about 550° C., and, preferably, 350° C. to 500° C. The ratio of ethanol to nitrogen oxide ($HC_1:NO_x$) is preferably at least about 2.0, preferably at least about 4.6, and more preferably, 8.6.

II. Ammonia Selective Catalyst

After the exhaust stream from the stationary combustion engine contacts the selective reductive catalyst, the exhaust stream composition has been altered and comprises nitrogen oxide and ammonia. The ammonia serves as the reductant for the reduction of nitrogen oxide to nitrogen and water using an ammonia selective catalyst. The reduction of nitrogen oxides with ammonia to form nitrogen and $H_2O$ is catalyzed by a suitable catalyst to preferentially result in the oxidation of ammonia by the oxygen, hence the process is often referred to as the selective catalytic reduction ("SCR") of nitrogen oxides. SCR of nitrogen oxides can be depicted by the following reactions:

  (3)

  (4)

The catalysts employed in the ammonia SCR step of the process ideally should be able to retain good catalytic activity under high temperature conditions of use, for example, 400° C. or higher, under hydrothermal conditions and in the presence of sulfur compounds. High temperature and hydrothermal conditions are often encountered in practice, such as in the treatment of gas turbine engine exhausts. The presence of sulfur or sulfur compounds is often encountered in treating the exhaust gases of coal-fired power plants and of turbines or other engines fueled with sulfur-containing fuels such as fuel oils and the like.

The ammonia selective catalyst is prepared using any method known in the art. The ammonia selective catalyst can be any form of catalyst known in the industry that reduces oxides of nitrogen. For the purpose of nitrogen oxide reduction, it is preferred to have an extruded homogeneous catalyst. One such embodiment is an extruded homogeneous honeycomb catalyst containing a mixture of vanadia and titania and, optionally, tungsten. Such catalysts are well known within the industry and typically provide low ammonia slip values. See, for instance, U.S. Pat. Nos. 4,833,113, 4,961,917, 7,332,148 and 7,527,776 and US Publication No. 2009/0081098. Catalyst-coated honeycombs or plates can also be used.

In some embodiments, an exogenous source of ammonia is incorporated upstream of the ammonia selective catalyst. Sensors at various positions in the exhaust stream are used to monitor reaction conditions and additional, exogenous ammonia can be metered in as necessary. An exogenous source of ammonia may be ammonia itself, or a compound that yields ammonia, such as urea.

III. Optional Ammonia Oxidation Catalyst

A common problem with ammonia SCR technology is that some residual ammonia, known as "ammonia slip," negatively impacts downstream components and processes such as: air pre-heater fouling, fly ash contamination, and ammonia gas emission into the atmosphere. Accordingly, in some embodiments, the method further comprises contacting, in the presence of an oxidant, an ammonia oxidation catalyst with the exhaust stream from the ammonia SCR, which may contain residual, unreacted ammonia, to convert ammonia slip to nitrogen. The oxidant is typically oxygen in the form of air that is already present in the exhaust gas stream to be treated. However, if necessary, a supplemental supply of air may be injected into the exhaust gas stream in order to insure that the oxygen content during the reaction is sufficiently high for the reaction to occur. Preferably, the ammonia oxidation catalyst selectively and efficiently catalyzes ammonia to nitrogen gas conversion with minimal conversion to NO.

Ammonia oxidation occurs by the following reactions:

  (5)

  (6)

  (7)

Any ammonia oxidation catalyst known in the art may be used. Exemplary ammonia oxidation catalysts are disclosed in commonly-assigned U.S. Pat. No. 7,393,511 and U.S. Publication No. 20090087367.

In some embodiments, the ammonia oxidation catalyst comprises a precious metal and vanadia on a metal oxide support selected from the group consisting of titania, alumina, silica, alumina-silica, zirconia, magnesium oxide, hafnium oxide, and lanthanum oxide. The precious metal is selected from the group consisting of platinum, palladium, rhodium and gold. Platinum has been found to be the most active of the precious metals. The catalytic components of precious metal and vanadia on titania are typically present in amounts of from about 1.0 g to about 2.5 g/in³ relative to the substrate, such as a honeycomb substrate. The amount of precious metal generally ranges from about 0.1 to 2.0% by weight relative to the metal oxide support, such as titania. In some embodiments, the precious metal will range from 0.7 to 1.5 wt %. Vanadia will generally be present in amounts of from about 1.0 to 10 wt % of the metal oxide support.

In other embodiments, the ammonia oxidation catalyst comprises one or more precious metals and a base metal compound supported on a zeolite. Typically, any known zeolite can be used in the ammonia oxidation catalyst. The zeolite can be a natural or synthetic zeolite such as faujasite, chabazite, clinoptilolite, mordenite, ferrierite, silicalite, zeolite X, zeolite Y, ultrastable zeolite Y, ZSM zeolite, ZSM-5, offretite, or a beta zeolite. In some embodiments, the zeolite is one of mordenite, ferrierite, zeolite Y, and a beta zeolite. Any known base metal can be used with the ammonia oxidation catalyst. In one embodiment, a base metal-oxygen complex comprising multiple metal and oxygen atoms (e.g., O—Cu—O—Cu—O—Cu—O)) is used. Exemplary base-metal-oxygen complexes include those of copper, vanadium, manganese, zinc, zirconium, and molybdenum. In another embodiment, a base metal oxide is used. Exemplary metal oxides include copper oxide, vanadium oxide, manganese oxide, zinc oxide, zirconium oxide, molybdenum oxide and their corresponding ions. Typically, the amount of base metal compound added to the ammonia oxidation catalyst ranges from about 2 wt % to about 20 wt % relative to the zeolite. The precious metal is selected from the group consisting of platinum, palladium, rhodium and gold. Platinum has been found to be the most active of the precious metals. The ammonia oxidation catalyst of the present invention may contain a precious metal loading of from about 0.1 to about 100 g/ft$^3$. The ammonia oxidation catalyst may be made by any method known in the art.

Normally, the operating temperature of the ammonia oxidation catalyst should remain close to the operating temperature of the ammonia SCR catalyst. For most noble metals, it has been found that the oxidation catalyst temperature should range between about 105° C. and 350° C., with the maximum operating temperature range being about 100° C. to 700° C. Typical operating temperatures for the ammonia oxidation catalyst in the described method are from about 200° to about 450° C. Acceptable catalyst space velocities range between about 5,000 and 150,000 hr$^{-1}$.

Exhaust gas streams that can be treated in accordance with the method often inherently contain substantial amounts of oxygen. For example, a typical exhaust gas of a turbine engine contains from about 2 to 15 volume percent oxygen and from about 20 to 500 volume parts per million nitrogen oxides, the latter normally comprising a mixture of NO and $NO_2$. Usually, there is sufficient oxygen present in the gaseous stream to oxidize residual ammonia, even when an excess over the stoichiometric amount of ammonia required to reduce all the nitrogen oxides present is employed. However, in cases where a very large excess over the stoichiometric amount of ammonia is utilized, or wherein the gaseous stream to be treated is lacking or low in oxygen content, an oxygen-containing gas, usually air, may be introduced between the ammonia SCR and the ammonia oxidation catalyst, in order to insure that adequate oxygen is present in the ammonia oxidation catalyst for the oxidation of residual or excess ammonia.

The disclosures of each and every patent, patent application, and publication cited herein are hereby incorporated herein by reference in their entirety for all purposes.

While the method has been disclosed with reference to specific embodiments, it is apparent that other embodiments and variations of the method may be devised by others skilled in the art without departing from the true spirit and scope of the method. The appended claims are intended to be construed to include all such embodiments and equivalent variations.

What is claimed is:

1. A method for treating a gas stream generated by a stationary combustion source, said method comprising:
   contacting a first exhaust stream from a stationary combustion source with a selective reduction catalyst, wherein said first exhaust stream comprises nitrogen oxide and a reductant comprising a hydrogen-containing compound, and wherein the selective reduction catalyst is effective to reduce nitrogen oxide to ammonia under the steady state conditions of the gas stream generated by the stationary combustion source, thereby reducing a portion of said nitrogen oxide to ammonia to produce a second exhaust stream comprising nitrogen oxide and ammonia, and
   contacting said second exhaust stream with an ammonia selective catalyst, wherein the ammonia selective catalyst is effective to reduce nitrogen oxide to nitrogen gas and water under the steady state conditions of the gas stream generated by the stationary combustion source, thereby reducing at least some of said nitrogen oxide in said second exhaust stream to nitrogen gas and water to produce a third exhaust stream,
   thereby treating said gas stream.

2. The method of claim 1, wherein the reductant is selected from the group consisting of hydrogen, one or more oxygenated hydrocarbons, one or more non-oxygenated hydrocarbons and mixtures thereof.

3. The method of claim 1, wherein the selective reduction catalyst comprises silver particles dispersed on alumina particles.

4. The method of claim 1, wherein the selective reduction catalyst comprises a metal selected from the group consisting of copper, silver, gold, vanadium, niobium, tantalum, chromium, molybdenum, tungsten, manganese, rhenium, iron, cobalt, nickel, ruthenium, rhodium, palladium, platinum, osmium and iridium.

5. The method of claim 2, wherein said hydrocarbon is a mixture of one or more oxygenated hydrocarbons and one or more non-oxygenated hydrocarbons.

6. The method of claim 5, wherein said one or more oxygenated hydrocarbons are selected from the group consisting of C1 to C4 alcohols and C2 diols.

7. The method of claim 6, wherein said oxygenated hydrocarbon is ethanol and said non-oxygenated hydrocarbon is selected from the group consisting of gasoline and diesel.

8. The method of claim 1, wherein said reductant is provided endogenously in said first exhaust stream.

9. The method of claim 1, wherein said reductant is provided exogenously in said first exhaust stream.

10. The method of claim 1, further comprising contacting said third exhaust stream with an ammonia oxidation catalyst, wherein said third exhaust stream comprises unreacted ammonia and an oxidant, thereby oxidizing at least a portion of said unreacted ammonia to nitrogen.

11. The method of claim 10, wherein said ammonia oxidation catalyst comprises one of a precious metal and a base metal compound on a zeolite support, or a precious metal and vanadia on a metal oxide support.

12. The method of claim 3, wherein the silver particles have an average diameter of less than about 20 nm.

13. The method of claim 3, wherein said selective reduction catalyst is substantially free of silver metal.

14. The method of claim 3, wherein said selective reduction catalyst is substantially free of silver aluminate.

15. The method of claim 3, wherein said selective reduction catalyst is prepared using hydroxylated alumina.

16. The method of claim 15, wherein said hydroxylated alumina is selected from the group consisting of: boehmite, pseudoboehmite, gelatinous boehmite, diaspore, nordstrandite, bayerite, gibbsite, alumina having hydroxyl groups added to the surface, and mixtures thereof.

17. The method of claim 3, wherein said selective reduction catalyst comprises about 2 wt % to about 4 wt % silver on a $Ag_2O$ basis.

18. The method of claim 1, wherein said reductant is hydrogen.

19. The method of claim 1, wherein the steady state condition of the gas stream generated by the stationary combustion source contains from about 2 to 15 volume percent oxygen.

20. A method for treating a gas stream generated by a stationary combustion source, said method comprising:
   contacting a first exhaust stream from a stationary combustion source with a selective reduction catalyst, wherein said first exhaust stream comprises nitrogen oxide and a reductant comprising a hydrogen-containing compound, wherein the reductant is provided exogenously, thereby reducing a portion of said nitrogen oxide to ammonia to produce a second exhaust stream comprising nitrogen oxide and ammonia, and
   contacting said second exhaust stream with an ammonia selective catalyst, thereby reducing at least some of said nitrogen oxide in said second exhaust stream to nitrogen gas and water to produce a third exhaust stream,
thereby treating said gas stream.

* * * * *